United States Patent [19]
Huffington

[11] Patent Number: 5,308,957
[45] Date of Patent: May 3, 1994

[54] HEATER CONTROL SYSTEM
[75] Inventor: Jeff Huffington, Cary, Ill.
[73] Assignee: Eaton Corporation, Cleveland, Ohio
[21] Appl. No.: 966,934
[22] Filed: Oct. 27, 1992
[51] Int. Cl.[5] .............................................. H05B 1/02
[52] U.S. Cl. .................... 219/483; 219/486; 219/413; 219/519; 219/494
[58] Field of Search ............... 219/492, 494, 497, 413, 219/519, 508, 483–486, 501, 506; 307/117

[56] References Cited
U.S. PATENT DOCUMENTS 2,675,455  4/1954  Richardson ......................... 219/494
5,015,827  5/1991  Kadwell et al. ..................... 219/497

Primary Examiner—Mark H. Paschall
Attorney, Agent, or Firm—R. A. Johnston

[57] ABSTRACT

A control system for dual oven resistance heaters (BAKE, BROIL) has opposite sides of each heater connected to a common side of one of a pair of SPDT switching relays such that no current flows to the heaters when both relays are in a common state of energization/de-energization. A microcomputer receives a signal from the oven temperature sensing and signals separate switching devices to selectively energize/de-energize one of the relays to switch on the desired heater. Separate comparators also receive the temperature sensor signal; and, in the event of failure of the microcomputer or switching devices with a heater "ON", the comparator is operative to bring the relays to a common state, preventing current flow to either heater.

4 Claims, 2 Drawing Sheets

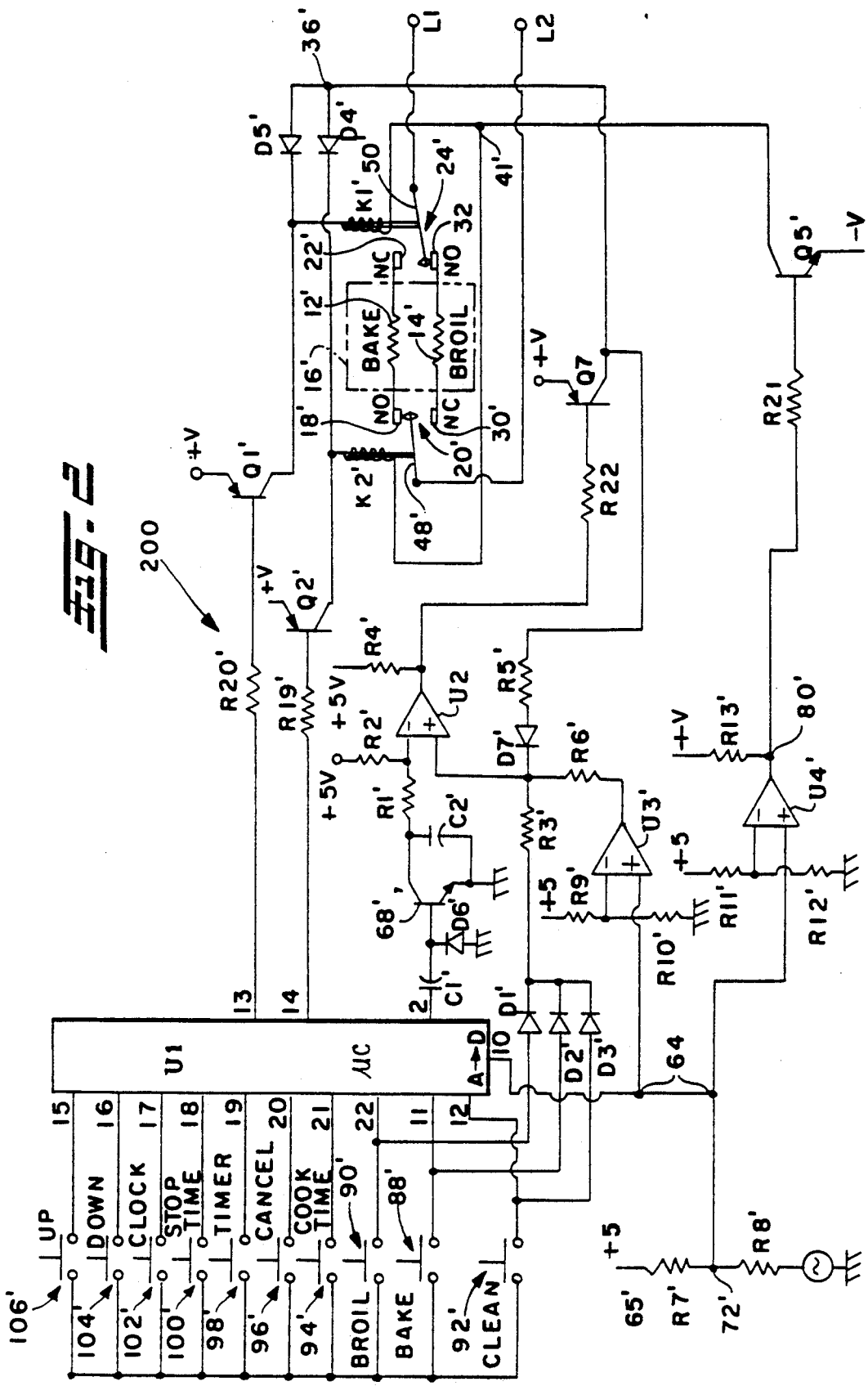

HEATER CONTROL SYSTEM

BACKGROUND OF THE INVENTION

The present invention relates to controls for the cycling of electrical heaters as, for example, in an oven, to maintain a regulated temperature environment in the space to be heated. The invention particularly relates to control systems for temperature regulation of the type employed in household cooking ovens utilizing electrical resistance heating elements. Typically, in such cooking ovens, a thermostatic switch senses the temperature of the air in the oven and turns the heating element on or off, depending on whether the sensed temperature is above or below the user-selected regulation temperature.

In the interests of safety, a separate limit control switch is series connected with the thermostatically controlled switch to provide cutoff of the heater current in the event of a malfunction in the thermostatic switch.

The thermostatic switches, which are typically bimetal devices, require a user selection of a precalibrated spring bias thereon for selection of the temperature about which the oven is to be regulated; and, it has been desired to eliminate such switches because of the volume of the switches and the space limitations at the control or mounting panel.

In recent times, it has been desired to provide an all-electronic controller for electrical oven or space heaters and to thereby eliminate the expense and space requirements for thermostatic switches for selecting the temperature of regulation. However, where solid state electronic switching components are employed, the limitations of the low voltage, low current handling capabilities of the solid state electronic components has necessitated the use of electromechanical relays for switching the load current to the heating elements such as the BAKE and BROIL elements in a household cooking oven. Where bimetal thermostats are employed instead of solid state controlling components, the bimetal thermostat is capable of performing the same switching function as the electromechanical relay; and, the thermostatically controlled type system thus has a manufacturing cost advantage over the electronic oven control system.

However, the increased functional capability and sophistication of electronic microcomputers has brought about a certain market demand for electronically controlled appliances, and it has thus been desired to provide electronic control of oven heating elements despite the necessity of employing electromechanical relays to energize and de-energize the oven heaters. Where bimetallic thermostatically controlled switches have been employed for oven temperature regulation, it has been a simple matter of providing an additional such thermostatic switch as an over-temperature or limit control to provide a backup in the event of failure of the oven regulation thermostatic switch; and, this technique has proven cost-effective for providing oven temperature limiting safety switches.

However, where an all electronic oven control system is employed, particularly a system utilizing a microcomputer, it is required to provide a separate temperature limiting switching means to provide for high temperature cutoff of the heating elements in the event of failure of the microcomputer. Accordingly, it has been desired to provide a simple yet reliable and cost-effective way or means of providing over-temperature limit control in an electronic control system for cycling electronic heaters to maintain a regulated temperature in a space to be heated, and particularly in household cooking ovens.

SUMMARY OF THE INVENTION

The present invention provides a control system for regulating the cycling of electric heating elements for heating a space such as in an oven, and particularly a household cooking oven, and employs a solid-state microcomputer which receives a signal from an oven temperature sensor and provides appropriate control outputs to solid state switches for controlling the energization and de-energization of a pair of electromechanical relays which control current flow to the oven BAKE and BROIL heating elements. The load switches in each of the relays are SPDT-type devices with the common terminal of one relay connected to one side of the power line, and the common terminal of the other relay connected to the opposite side of the load current power line. The first or BAKE heating element is connected between the normally open terminal of the first relay and the normally closed side terminal of the second relay. The second or BROIL heating element is connected between the normally closed terminal of the first relay and the normally open terminal of the second relay. With both relays in the same state of energization or de-energization, no load current flows to either heating element. The microcomputer is operative to separately and individually energize and de-energize one of the relays to provide current flow to the selected heater for providing regulated heating about a desired programmed temperature.

The present invention provides over-temperature or limit control by separate comparators which respond to the oven temperature sensor signal; and, the over-temperature comparators are operable to provide for appropriate energization or de-energization, as the case may be, of the remaining relay to bring it to the same state as the in-service relay, thereby breaking the current flow to the active heating element. The over-temperature comparator circuit of the present invention thus by-passes the microcomputer to provide over-temperature or upper temperature limiting safety cutoff for the active heating element without the need for an additional electromechanical relay.

DETAILED DESCRIPTION

Figure 1:
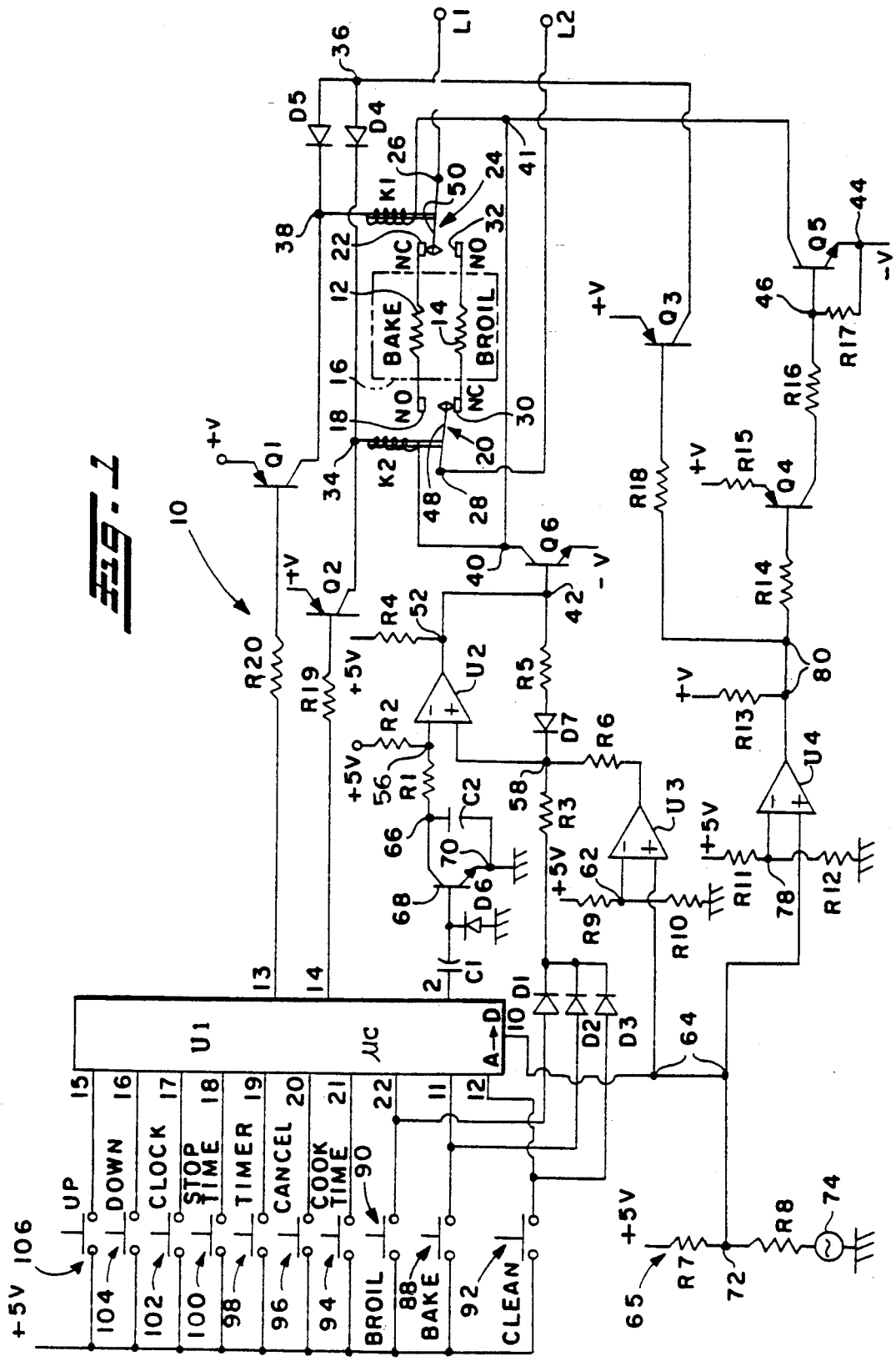
FIG. 1 is a schematic representation of the circuit for one embodiment of the invention; and, FIG. 2 is a schematic similar to FIG. 1 of a second embodiment of the invention.

Referring to FIG. 1, the control system of the present invention is indicated generally at 10, and includes a first or BAKE heater 12, and a second or BROIL heater 14, which are located remotely in an oven indicated by dashed outline and reference numeral 16. One side of the heater 12 is connected to a normally open side contact 18 of a single-pole double-throw switch indicated generally at 20, and which is part of relay K2. The opposite side of heater 12 is connected to a normally closed side contact 22 of a single pole double-throw switch indicated generally at 24 which has the common terminal 26 thereof connected to one side L1 of a power line.

The opposite side L2 of the power line is connected to the common terminal 28 of a single pole double-throw switch 20. The second or BROIL heater coil 14 is connected on one side to normally closed contact 30 of switch 20; and, the opposite side of heater 14 is connected to normally open contact 32 of switch 24. The coil of relay K2 receives power through junction 34, which is connected to the collector of switching device Q2, which has its emitter biased to voltage +V and its base connected through resistor R19 to output terminal 14 of microcomputer device U1. Junction 34 is also connected through reversed poled diode D4 to junction 36, which is connected through diode D5 forward poled to junction 38.

One side of the coil of relay K1 is connected to junction 38, which is connected to the collector of switching device Q1, which has its emitter biased to a voltage +V and its base connected through resistor R20 to output 13 of microcomputer U1. The opposite side of coil K2 is connected through junction 40 to the collector of switching device Q6, which has its emitter connected to voltage source —V and its base connected to junction 42. Junction 40 is also connected to junction 41, which is connected to the opposite side of the coil of relay K1; and, junction 42 is also connected to the collector of switching device Q5, which has its collector connected to junction 44, which is connected to a voltage source —V. The base of Q5 is connected to junction 46, which is connected through resistor R17 to junction 44.

It will be understood that relay K2 has the armature thereof connected to operate the transfer or movable contact member 48 of switch 20; and, the armature of relay K1 is connected to the transfer or movable contact member 50 of switch 24.

Junction 42 receives a signal from the output junction 52 of comparator U2, which output is biased through resistor R4 from a supply of +5 volts. Comparator U2 has the negative input thereof connected to junction 56 with the positive input connected to junction 58, which is connected through reverse poled diode D7 and through resistor R5 to junction 42, and through resistor R6 to the output of comparator U3. Comparator U3 has the negative input thereof connected to junction 62, which is biased through resistor R9 from a +5 volt source; and, junction 62 is also connected through resistor R10 to ground. The positive input of comparator U3 is connected to junction 64 and to the A-D input pin 10 of U1.

Junction 56 is connected through resistor R1 to junction 66, which is connected to the collector of a switching device 68, which has its emitter grounded through junction 70; and, junction 70 is also connected through capacitor C2 to junction 66. The base of switching device 68 is connected through capacitor C1 to output pin 2 of device U1; and, the base of switching device 68 is protected by a reverse poled diode D6.

Junction 64 receives a signal from the oven sensor indicated generally at 65 and shown as resistance R7, which is connected to a +5 volt supply. The sensor is connected to junction 72, which is connected through resistor R8 to a current source 74. The oven sensor's signal from junction 72 is also applied to the positive input of a comparator U4, which has the negative input thereof biased from a +5 volt source through resistor R11 at junction 78, which is also connected through resistor R12 to ground. The output of comparator U4 is connected to junction 80, and through resistor R14 to the base of switching device Q4. Junction 80 is also connected through resistor R18 to the base of switch Q3, which has its emitter biased from a supply +V and its collector connected to diode junction 36.

Q4 has its emitter biased from a supply +V through resistor R15; and, the collector of Q4 is connected through resistor R16 to junction 46 and the base of Q5. Junction 46 is also connected through resistor R17 to junction 44, which is connected to voltage source —V.

The user inputs to the control system are through a series of switches indicated generally by reference numerals 88 through 106 for various control functions including the BAKE, BROIL, CLEAN, COOK TIME, CANCEL, TIMER, STOP TIME, CLOCK, DOWN, and UP, with the latter two effecting slewing of the time functions. The switches are connected respectively to pins 11, 22, 12, 21, 20, 19, 18, 17, 16, and 15 of the microcomputer U1. In the presently preferred practice, the microcomputer U1 comprises a Hitachi HMCS 4148C device, or alternatively a Motorola MC6805(K3) device, with the pin numbers illustrated in the drawings for the second-mentioned device.

The values and designation of resistors, capacitors, and switching devices and other solid state devices are given in Table I set forth below:

TABLE I

| RESIS-TANCES R-OHMS | | CAPACI-TANCES C-Ufds | | OTHER DEVICES | |
|---|---|---|---|---|---|
| 1. | 22K | 1. | .01 | D1-3 | 1N4148 |
| 2. | 100K | 2. | 22 | D4,5 | 1N4004 |
| 3-5 | 22K | | | D6,7 | 1N4148 |
| 6. | 10K | | | Q1-4,7 | 2N4403 |
| 7. | 1-3K | | | Q5-6 | 2N4401 |
| 8. | 3.96K | | | K1,2 | T90 FORM C |
| 9. | 30.5K | | | U1 | MC6805S2 |
| 10. | 42.2K | | | U2-4 | ¼ LM 339 |
| 11. | 31.5 | | | | |
| 12. | 43.2 | | | | |
| 13-22 | 10K | | | | |

In operation, when either the BAKE, BROIL, or CLEAN switch is closed by the user, the microcomputer U1 senses closure of the switch by the user and outputs at pin 2 an AC coupled signal to the capacitor C1, which passes the AC signal to switch 68 which, upon conducting, discharges capacitors C2, causing the comparator U2 to change state. The change in state of the output of comparator U2 at junction 42 causes Q6 to switch, which alters the feedback to R5 to the positive input, thereby keeping comparator U2 "ON" when the user's momentary depression of the switch 88, 90, or 92 is released. Thus, for normal operation of any of the BAKE, BROIL, or CLEAN functions the microcomputer is programmed by actuation of the appropriate switches and arms the selected operating heater by signals from the microprocessor from either output 13 or 14 through switch Q1 or Q2 to enable the appropriate relay for providing current flow to the selected heater coil 12 or 14.

Assuming that the oven sensor 65 has sensed a temperature below that of the desired limit temperature, the comparator U3 is operative to change the bias on the positive input of comparator U2 to thereby alter the feedback loop and cause comparator U2 to change state at its output, and thereby turn off switch Q6. The oven temperature signal from junction 64 and 72 causes comparator U3 to change state and switch Q6 to thereby cause both relays K2,K1 to move to a common state which results in switching off current to the heater coil devices 12,14.

In the event that comparator U3 fails, the signal from oven temperature sensor 72 is also applied to comparator U4, which changes state and switches on switches Q3, Q4, and Q5, thereby energizing the coils to both relays K2,K1, causing the relays to switches 20,24 to assume a common state, thereby switching off current to the heaters 12, 14. Thus, the system can, upon failure of either the devices Q1,Q2, the microcomputer U1, or comparator U3 regulate about the settings of the comparator U4 to add a second degree of redundancy to the system.

Referring to FIG. 2, an alternate embodiment of the invention indicated generally at 100 has the corresponding like elements thereof correspondingly numbered with the like numerals primed to indicate identical values with respect to like elements in the embodiment of FIG. 1. It will be understood that unprimed numerals in the embodiment of FIG. 2 denote elements unique to the embodiment 100.

The control systems 200 of FIG. 2 has the output of comparator 54' at junction 42' connected through R22 to the base of a switch Q7 biased at its emitter with a supply +V, and with its collector connected to junction 36' such that Q7 is controlled by comparator U2' to enable the coils of relays K1' and K2'. The opposite side of both coils of relays K2',K1' are connected directly to junction 42', which is connected to the collector of switching device Q5'. Q5' receives a signal at its base through resistor R21 from junction 80'; and, Q5' has its emitter connected to a negative supply voltage −V.

The embodiment 100 of FIG. 2 thus has the coils of relays K2',K1' normally energized to cause switches 20',24' to have the contact transfer elements thereof moved to close the normally open contacts 18',32' thereof. The safety comparator U4' causes the relays to return to the unactuated or de-energized condition, and the switches 20',24' return to the normally closed state upon the switching "OFF" of the device Q5'.

The embodiment of FIG. 1 thus employs the relays K2,K1 normally de-energized; and, upon user activation of any of the function switches 88, 90, or 92, the microcomputer U1 energizes one of the relays. Whereas, conversely, the embodiment of FIG. 2 employs the relays K2',K1' normally energized; and, upon closure of any of the function switches 88, 90, or 92 by the user, the microprocessor U1 is operative to de-energize the appropriate relay K2',K1'.

The present invention thus provides a unique control circuit for operating plural electrical heaters, particularly in an oven, where a temperature sensor cycles the heaters through a pair of relays having adjacent sides thereof series connected through the heaters for normal operation.

In the event of malfunction of any of the solid state switching devices, including the microcomputer, the output of the temperature sensor is applied to auxiliary comparator circuits to cause the relays to assume a common state, thereby preventing current flow to either of the heaters.

The present invention thus employs electronic microcomputer control of a pair or relays for controlling separate heating elements and provide redundancy for changing relay states and cutting off current to the heaters in the "ON" mode. In the event of welded contacts or other failure, the in-service relay with either heater "ON", the control system provides for auxiliary means, separate from the microcomputer to cause the other (not in-service) relay to change state and cut off current to the "ON" heater.

Although the invention has hereinabove been described with respect to the illustrated embodiments, it will be understood that the invention is capable of modification and variation, and is limited only by the following claims:

I claim:

1. A control system for a first (bake) and a second (broil) heater, comprising:
    (a) a first SPDT switch means having a first normally open (NO) and a first normally closed (NC) stationary contact and a transfer contact member movable between said NC and NO contacts, said transfer member connected to one side of a powerline;
    (b) a second SPDT switch means having a second NO and second NC stationary contact and a transfer contact member movable between said NC and NO contacts, said transfer member connected to the opposite side of said powerline;
    (c) a first (bake) heating element connected between the NO contact of said first switch means and the NC contact of said second switch means;
    (d) a second (broil) heating element connected between said first NC contact of said first switch means and said second NO contact of said second switch means;
    (e) a first circuit means including first relay means operable, upon energization and de-energization to move said transfer member between said first NC and said first NO contact of said first switch means;
    (f) second circuit means including second relay means operable, upon energization and de-energization, to move said transfer member between said second NC and said second NO contact of said second switch means;
    (g) means operable, when one of said relays is energized and current is flowing through one of said first and second elements, to sense an oven temperature condition and energize the other of said relays for switching the current off to said one element; and,
    (h) user select circuit means including microcomputer means operable to energize said first and second relay means individually for normal operation of said heaters.

2. The control system defined in claim 1, wherein said means sensing oven temperature comprises a comparator operating a solid state switch connected to energize both of said first and second relay means simultaneously.

3. The control system defined in claim 1, wherein said first and second relay means are operative upon energization to move respectively said first and second switch transfer means from said NC contact to said NO contact; and, said first circuit means includes means operative to energize said first and second relay means simultaneously when it is desired to prevent current flow to either of said first and second elements and said user select circuit means is operative to de-energize one of said first and second relay means when it is desired to provide current flow to one of said heater elements.

4. The control system defined in claim 1, further comprising latch circuit means including comparator means enabled by a clocked signal from said microcomputer and oven temperature sensing means to prevent current flow to said relays in either the absence of said clocked signal or the presence of a signal from said oven temperature signal.

* * * * *